United States Patent
Wang et al.

(10) Patent No.: US 12,358,240 B2
(45) Date of Patent: Jul. 15, 2025

(54) TAPE LAYING DEVICE

(71) Applicant: Industrial Technology Research Institute, Hsinchu (TW)

(72) Inventors: Teng-Yen Wang, Yunlin County (TW); Shun-Sheng Ko, Kaohsiung (TW); Miao-Chang Wu, Tainan (TW); Tung-Ying Lin, Kaohsiung (TW); Chao-Hong Hsu, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 289 days.

(21) Appl. No.: 18/077,048

(22) Filed: Dec. 7, 2022

(65) Prior Publication Data
US 2024/0131808 A1 Apr. 25, 2024
US 2024/0227324 A9 Jul. 11, 2024

(30) Foreign Application Priority Data

Oct. 25, 2022 (TW) ................... 111140473

(51) Int. Cl.
*B29C 70/38* (2006.01)
*B29C 70/54* (2006.01)

(52) U.S. Cl.
CPC .......... *B29C 70/388* (2013.01); *B29C 70/545* (2013.01); *B29C 2793/009* (2013.01);
(Continued)

(58) Field of Classification Search
CPC ............... B29C 70/388; B29C 70/545; B29C 2793/009; B29C 70/386; B29C 70/54;
(Continued)

(56) References Cited

U.S. PATENT DOCUMENTS 7,063,118 B2 6/2006 Hauber
7,810,539 B2 10/2010 Mischler
(Continued)

FOREIGN PATENT DOCUMENTS

CN 208020901 U 10/2018
CN 109823901 A 5/2019
(Continued)

OTHER PUBLICATIONS

CN111196046A Machine Translation of Description (Year: 2024).*
(Continued)

*Primary Examiner* — Cynthia L Schaller
(74) *Attorney, Agent, or Firm* — WPAT, PC

(57) ABSTRACT

A tape laying device includes a tape transmission mechanism, a compaction head mechanism, a cutter mechanism, a heating mechanism and a motion mechanism. The tape transmission mechanism is configured to transmit the pre-impregnated tape. The compaction head mechanism, connected with the tape transmission mechanism, is configured to depress and drive the pre-impregnated tape transmitted by the tape transmission mechanism to follow a moving path so as to adhere the pre-impregnated tape onto the mould surface. The cutter mechanism is configured to cut the pre-impregnated tape. The heating mechanism, disposed downstream to the cutter mechanism, is configured to heat the pre-impregnated tape. The motion mechanism is used to have the cutter mechanism having an active path to move toward the moving path while the cutter mechanism cuts the pre-impregnated tape.

29 Claims, 10 Drawing Sheets

(52) U.S. Cl.
CPC ............... *B29K 2995/0077* (2013.01); *B29K 2995/0089* (2013.01)

(58) Field of Classification Search
CPC .... B29K 2995/0077; B29K 2995/0089; B29B 13/023; B29B 15/125
See application file for complete search history.

(56) References Cited

U.S. PATENT DOCUMENTS

| | | | |
|---|---|---|---|
| 9,636,903 B2 | 5/2017 | Nishimura | |
| 2005/0061422 A1 | 3/2005 | Martin | |
| 2013/0094890 A1* | 4/2013 | Sodeyama | B26D 1/065 400/621 |
| 2021/0046716 A1* | 2/2021 | Li | B29C 53/8016 |
| 2021/0245487 A1* | 8/2021 | Boroughs | B32B 37/0053 |

FOREIGN PATENT DOCUMENTS

| | | | |
|---|---|---|---|
| CN | 111196046 A * | 5/2020 | |
| CN | 112456199 A | 3/2021 | |
| CN | 216181221 U | 4/2022 | |
| CN | 216403322 U | 4/2022 | |
| EP | 3406429 A1 | 11/2018 | |
| TW | 201720627 A | 6/2017 | |
| TW | I716335 | 1/2021 | |
| TW | 202106599 A | 2/2021 | |
| TW | I678329 B | 2/2021 | |
| TW | 202204134 A | 2/2022 | |
| WO | WO2021010318 A1 * | 1/2021 | |

OTHER PUBLICATIONS

WO2021010318A1 Machine Translation of Description (Year: 2024).*
TW OA issued on Jan. 10, 2023.
Rousseau et al. Automated Fiber Placement Path Planning: A state-of-the-art review, pp. 172-203, 2019, Computer-Aided Design & Applications.
Zacchia et al. "Design of Hard Compaction Rollers for Automated Fiber Placement on Complex Mandrel Geometries". 2018, CSME international Congress.
Denkena et al. "Thermographic online monitoring system for Automated Fiber Placement processes" pp. 239-243, 2016, Elsevier.

* cited by examiner

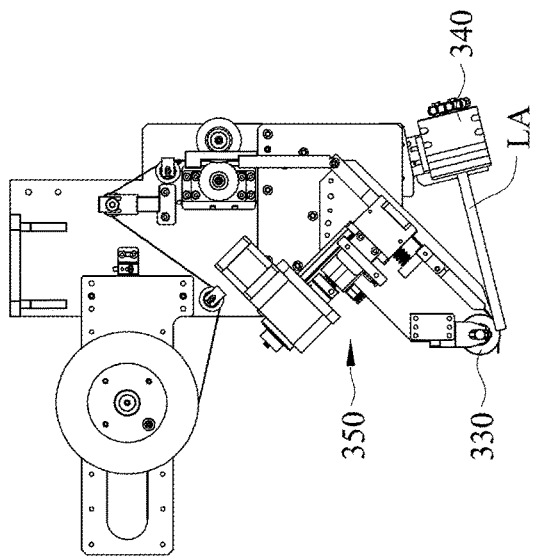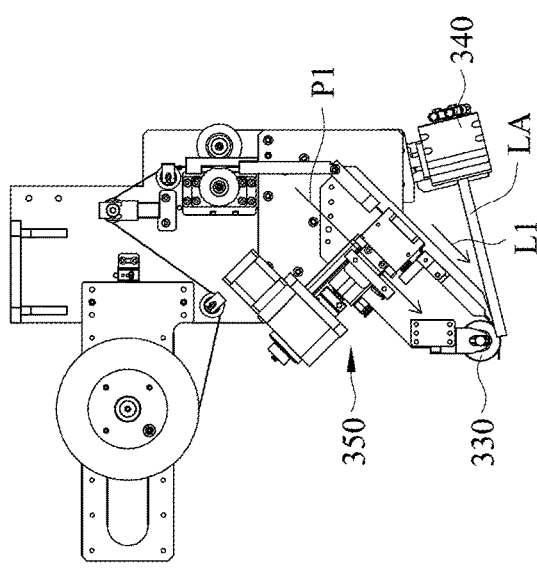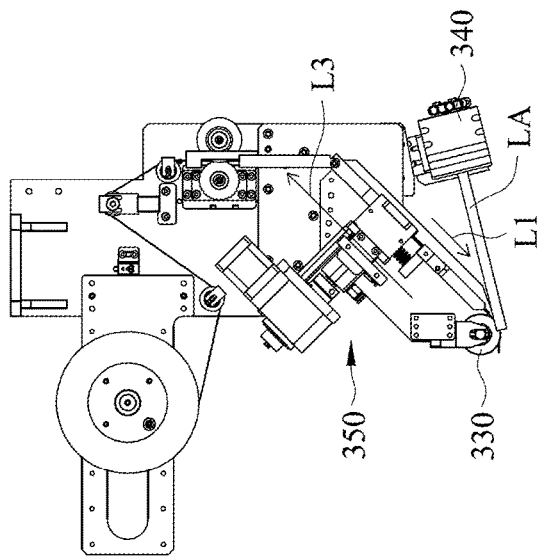
FIG. 6A  FIG. 6B  FIG. 6C
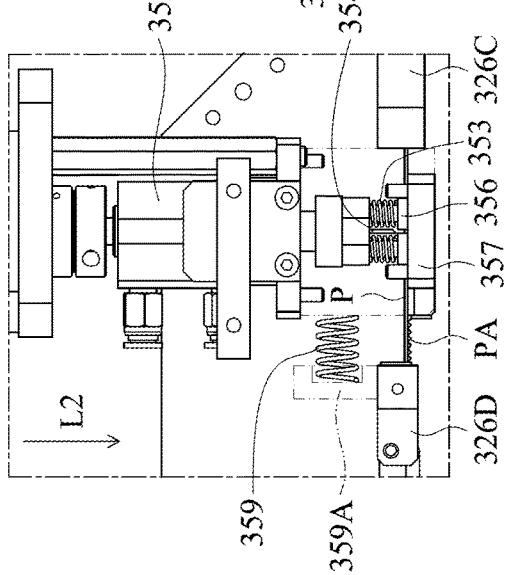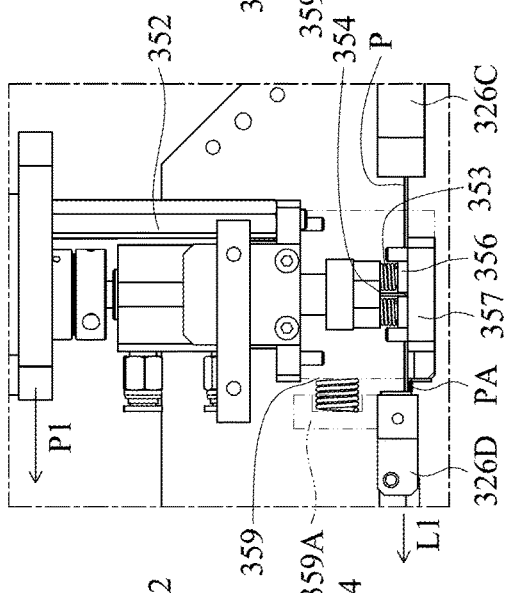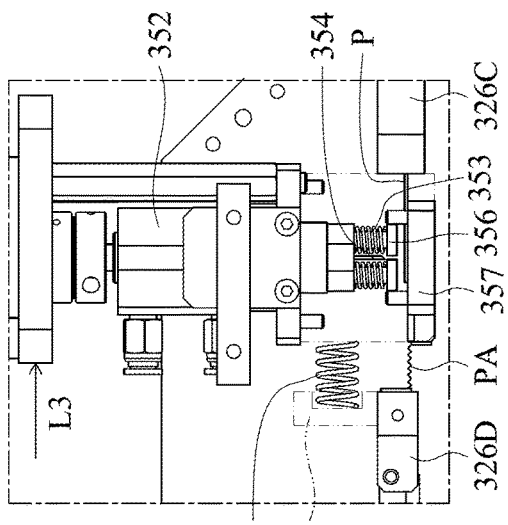
FIG. 7A  FIG. 7B  FIG. 7C

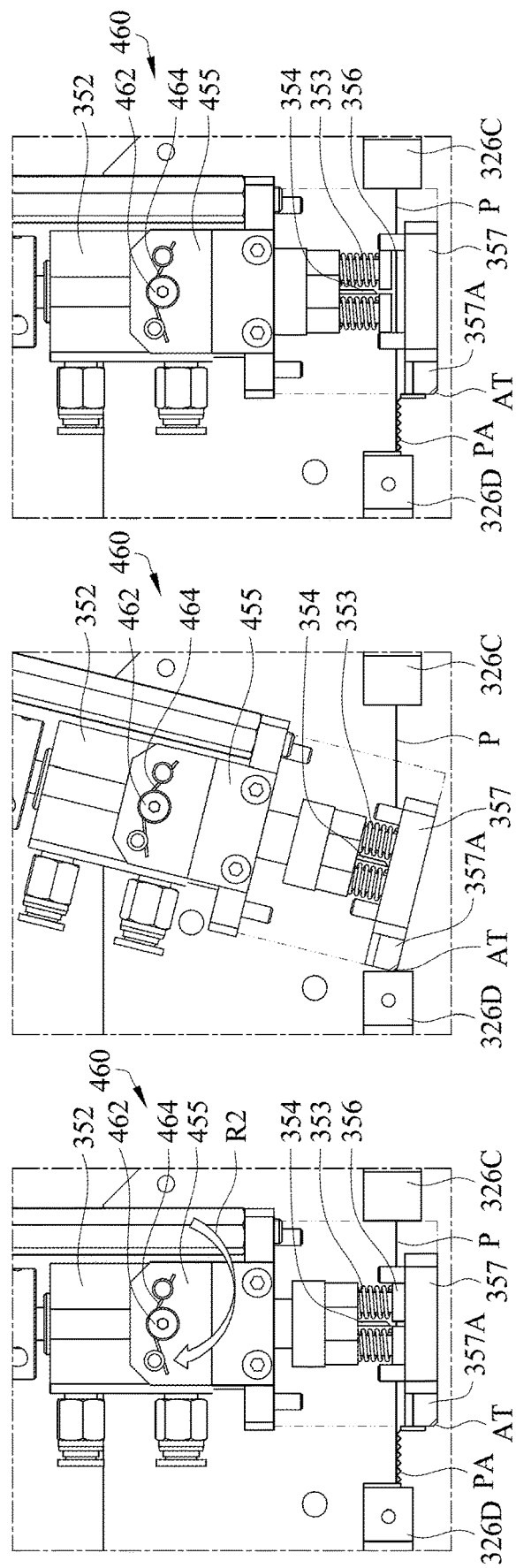

TAPE LAYING DEVICE

CROSS REFERENCE TO RELATED APPLICATION

This application claims the benefits of Taiwan application Serial No. 111140473, filed on Oct. 25, 2022, the disclosures of which are incorporated by references herein in its entirety.

TECHNICAL FIELD

The present disclosure relates in general to a tape laying device.

BACKGROUND

Generally, a carbon fiber reinforced polymer (CFRP) is featured in high hardness, high strength and light weight, and thus is widely used in aerospace, automobiles, wind powers and other industries that should provide reduced weight and less energy consumption. The CFRP is a composite material made by adding carbon fibers or pre-impregnated materials into a substrate such as a resin. The finished product is usually in a form of tape or sheet for easy being laminated or layered onto a surface of another product. Based on different materials, the CFRP can be divided into thermosetting and thermoplastic pre-impregnated materials. With maturity of high-power laser source technology, the need for the thermoplastic pre-impregnated materials to be heated up in a very short time can be now satisfied. Thus, the associated advantages thereof in manufacturing can be widely utilized. In addition, the thermoplastic pre-impregnated material can be heated and reused, and so excellent recyclability thereof over other materials is obvious. In response to the trend of environmental protection and green alternative energy, the demand for the thermoplastic pre-impregnated materials has greatly increased.

Generally speaking, the laminating process of the strip-shaped thermoplastic pre-impregnated material is to cover a target surface of the product strip by strip. Particularly, in each step of laminating the thermoplastic pre-impregnated materials, a bonding surface of the thermoplastic pre-impregnated material shall be heated to induce adhesiveness thereof. To meet the manufacturing features of this material, a conventional bonding equipment needs to be equipped with a heating device of specific specifications and a cutter to cut the pre-impregnated material into appropriate lengths. However, precise time control is necessary to feed the cutter while in cutting the pre-impregnated material. In the art, the conventional method is to stop feeding the pre-impregnated material before meeting an end of the pre-impregnated material, then to wait for the cutter to advance for cutting, and, after the cutting, to resume the feeding of the rest of the pre-impregnated material for another adhesion. During the aforesaid stop of the processing pre-impregnated material, the heating device continues to provide thermal energy to the stationary pre-impregnated material, from which overheating or even scorching might be met. In addition, if each of the pre-impregnated materials needs to wait for the feed time of the cutter, then, as the number of pre-impregnated materials to be attached to the respective products increases, the accumulated feed time of the cutter will greatly increase the overall process time.

Some manufacturers try to adjust the power of the heating device or turn off the heating device temporarily to avoid possible scorching at the surface of the pre-impregnated material. As a consequence, the temperature distribution in this pause area of the pre-impregnated material would be uneven, and accordingly possible defective fit resulted from poor adhesion of the pre-impregnated material might occur due to discontinuity and unevenness at the surface of the tape roll. Some other manufacturers try to stick the pre-impregnated material beyond the predetermined area of the product, so that the overheated part of the pre-impregnated material can fall outside the predetermined area. Then, after the lamination process in the predetermined area is completed, the above-mentioned overheated part of the pre-impregnated material would be cut off. However, such a process would inevitably increase the cost of materials.

In addition, in order to increase the bonding strength, plural pre-impregnated materials in different directions will be laminated together. However, since the cutter for this composite pre-impregnated material is kept at the same direction, thus it is quite possible that cut edges of individual pre-impregnated materials might not be perfectly aligned. Namely, after the cutting, some edges of the composite pre-impregnated material would exceed the predetermined area of the product.

Therefore, how to avoid or improve the aforesaid problem of the conventional laminating equipment resulted from the temporary pause while in cutting the tape roll becomes an issue needed to be urgently resolved in the art.

SUMMARY

In one embodiment of this disclosure, a tape laying device is applied to adhere a pre-impregnated tape onto a mould surface. The tape laying device includes a tape transmission mechanism, a compaction head mechanism, a cutter mechanism, a heating mechanism and a motion mechanism. The tape transmission mechanism is configured to transmit the pre-impregnated tape. The compaction head mechanism, connected with the tape transmission mechanism, is configured to depress and drive the pre-impregnated tape transmitted by the tape transmission mechanism to follow a moving path so as to adhere the pre-impregnated tape onto the mould surface. The cutter mechanism is configured to cut the pre-impregnated tape. The heating mechanism, disposed downstream to the cutter mechanism, is configured to heat the pre-impregnated tape. The motion mechanism is used to have the cutter mechanism having an active path to move toward the moving path while the cutter mechanism cuts the pre-impregnated tape.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 6A to FIG. 6C show schematically different motion states of the tape laying device of FIG. 1;

FIG. 7A is a schematic enlarged view of the cutter mechanism of FIG. 6A;

FIG. 7B is a schematic enlarged view of the cutter mechanism of FIG. 6B;

FIG. 7C is a schematic enlarged view of the cutter mechanism of FIG. 6C;

FIG. 13A to FIG. 13C show schematically different motion stages of the cutter mechanism of FIG. 12A.

DETAILED DESCRIPTION

Figure 1:
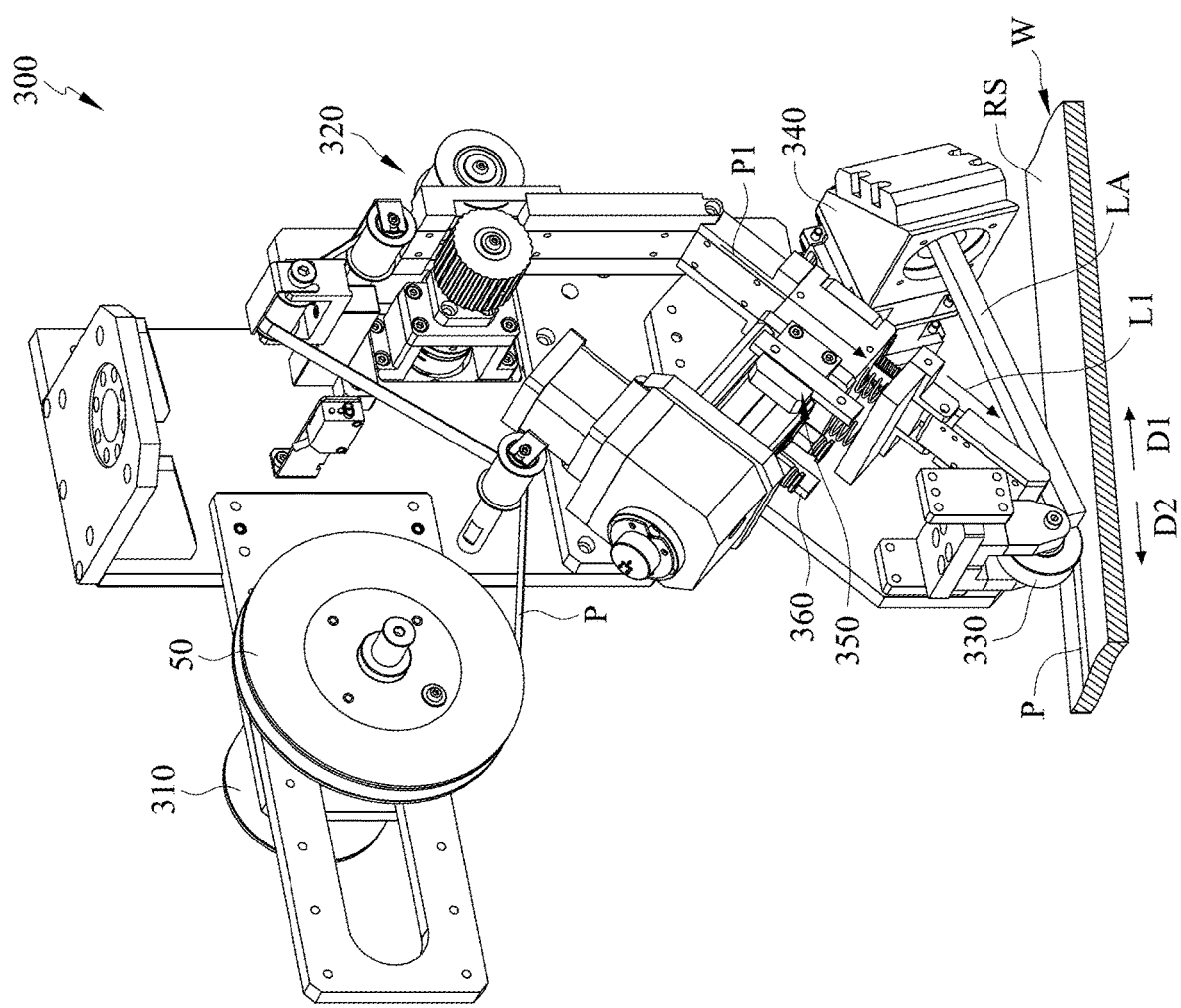
FIG. 1 is a schematic view of an embodiment of the tape laying device in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic view of an embodiment of the tape laying device in accordance with this disclosure. Referring to FIG. 1, in this embodiment, the tape laying device 300 is used to adhere a pre-impregnated tape (or prepreg tape) P on to a predetermined surface of a product, such as a mould surface RS of a workpiece W shown in FIG. 1. The pre-impregnated tape P can be a strip-type material formed by pre-impregnating carbon fibers or other polymers in a substrate such as a resin. The pre-impregnated tape P of this embodiment is a thermoplastic pre-impregnated tape, but not limited thereto.

In this embodiment, the tape laying device 300 includes an unreel mechanism 310, a tape transmission mechanism 320, a compaction head mechanism 330, a heating mechanism 340, a cutter mechanism 350 and a motion mechanism 360. The tape transmission mechanism 320, connected with the unreel mechanism 310, is used to receive the pre-impregnated tape P of a tape roll 50 driven by the unreel mechanism 310. The compaction head mechanism 330 is connected with the tape transmission mechanism 320. The tape transmission mechanism 320 is used to convey the pre-impregnated tape P of the tape roll 50 to the compaction head mechanism 330. According to this disclosure, The cutter mechanism 350 is to dispose at an upstream position with respect to the compaction head mechanism 330. For example, in this embodiment, the cutter mechanism 350 is disposed between the unreel mechanism 310 and the compaction head mechanism 330. The motion mechanism 360 is connected with the cutter mechanism 350.

The compaction head mechanism 330 is used to depress and drive the pre-impregnated tape P transported by the tape transmission mechanism 320 to move along a moving path L1, so as to laminate the pre-impregnated tape P onto the mould surface RS. In this embodiment, the compaction head mechanism 330 can be positioned close to or far away from the mould surface RS of the workpiece W. In some other embodiments, the compaction head mechanism 330 can be disposed stationarily, such as a roller, and can move along with the tape laying device 300 to displace with respect to the mould surface RS of the workpiece W so as to depress and laminate the pre-impregnated tape P provided by the unreel mechanism 310 onto the mould surface RS. As shown in FIG. 1, when the compaction head mechanism 330 moves with respect to the mould surface RS, either the compaction head mechanism 330 moving in a first direction D1 with respect to the mould surface RS or the mould surface RS moving in a second direction D2 reverse to the first direction D1 with respect to the compaction head mechanism 330, the pre-impregnated tape P of the tape roll 50 can be continuously depressed and adhered to the mould surface RS by the compaction head mechanism 330. According to this disclosure, the embodiment of the compaction head mechanism 330 is not particularly limited, but only suitable to depress and laminate the pre-impregnated tape P. For example, the compaction head mechanism can be also configured to a non-scrollable structure.

The heating mechanism 340, disposed at a position downstream to the cutter mechanism 350, is used to provide a heating light beam LA to heat the pre-impregnated tape P for generating stickiness. In this embodiment, the heating mechanism 340 can be a heating device of laser, infrared, halogen, gas flame or hot air. By having the pre-impregnated tape P of this embodiment as an example, the heating mechanism 340 is to heat the pre-impregnated tape P in the heating zone rapidly to a melting temperature about 300° C. Definitely, the type of the heating mechanism 340 is not limited in this disclosure, but the power of the heating mechanism 340 can be adjusted to meet the pre-impregnated tape P, or the heating mechanism 340 can be replaced by the other appropriate heating source. In addition, in one embodiment, the heating mechanism 340 can be movable so as able to further adjust heating direction and range thereof.

In this disclosure, with the motion mechanism 360, while in cutting the pre-impregnated tape P in the cutter mechanism 350, the cutter mechanism 350 moves along a moving path L1 to generate an active path P1, so that the pre-impregnated tape P can be continuously fed along the moving path L1. Thereupon, the pre-impregnated tape P can be posted and cut at the same time. In other words, the adhering of the pre-impregnated tape P needn't to be stopped, and thus the object of continuous lamination can be achieved such that the heat energy of the heating light beam LA can be continuously and stably provided to evenly heat the adhesive surface of the pre-impregnated tape P. Thus, the adhesion quality can be enhanced, the material of the pre-impregnated tape P can be saved without additional need of reserved material, and the processing time can be reduced.

TABLE 1

|  | Impact test absorbed impact energy (J/cm²) | Bending test flexural modulus (GPa) |
|---|---|---|
| Continuous lamination (this disclosure) | 195.9 | 62.35 |
| Non-continuous lamination (prior art) | 146.92 | 44.27 |

In addition, to verify advantages of continuous lamination of this disclosure, Table 1 lists results of impact tests and bending tests upon different specimens produced by the continuous lamination of this disclosure and the conventional non-continuous lamination in the art. As shown, the specimens produced by the tape laying device 300 of this disclosure, featured in continuous lamination, can absorb more impact energy in the impact test than those by the prior art can. In other words, the products provided by the tape laying device 300 of this disclosure can sustain more impact, and thus are not vulnerable to be deformed by external forcing. Further, in the bending test, it shows that the specimen of the continuous lamination provided in the disclosure can have a higher flexural modulus. In other words, the products prepared by thus disclosure is hard to be deformed within corresponding elastic limits.

Figure 2:
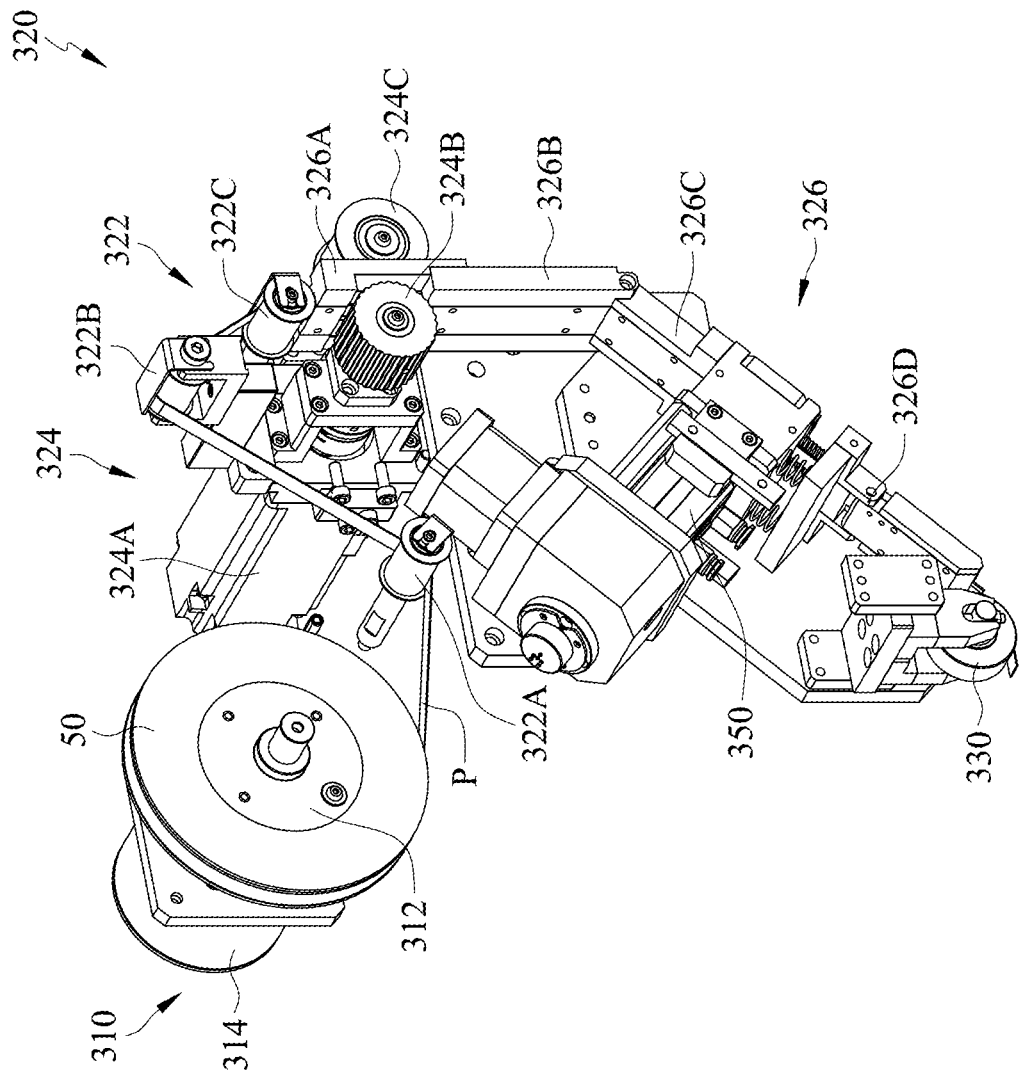
FIG. 2 shows schematically the unreel mechanism and the tape transmission mechanism of FIG. 1.

FIG. 2 shows schematically the unreel mechanism and the tape transmission mechanism of FIG. 1. Referring to FIG. 1 and FIG. 2, in this embodiment, the unreel mechanism 310, used to reel and thus store thereon the aforesaid pre-impregnated tape P, includes a reel shaft 312 and a torque limiter 314 connected with the reel shaft 312. The pre-impregnated tape P is collected as the tape roll 50 mounted at the reel shaft 312. The torque limiter 314 can adjust the rotational speed of the reel shaft 312 according to practical requirements, such that the tension of the pre-impregnated tape P can be controlled substantially to be a constant during the operation of providing the pre-impregnated tape P.

The tape transmission mechanism 320, connected with the unreel mechanism 310, includes an idler unit 322, a drive unit 324 and a guide-rail unit 326. The idler unit 322, connected with the unreel mechanism 310, is to receive the pre-impregnated tape P outputted from the unreel mechanism 310. The idler unit 322 is further connected with the drive unit 324, then the drive unit 324 is connected with the guide-rail unit 326, and further the guide-rail unit 326 is connected with the compaction head mechanism 330. The drive unit 324, used to displace the pre-impregnated tape P, can convey the pre-impregnated tape P to the cutter mechanism 350 and the compaction head mechanism 330 via the idler unit 322 and the guide-rail unit 326.

In one embodiment, the idler unit 322 includes at least one idler for maintaining the tension of the pre-impregnated tape P. For example, as shown in FIG. 2, the idler unit 322 includes a first idler 322A, a second idler 322B and a third idler 322C, in which the second idler 322B is disposed between the first idler 322A and the third idler 322C. In some other embodiments, the required number of idlers can be arbitrarily adjusted according to practical structural arrangements.

In one embodiment, the drive unit 324 includes a drive motor 324A, a roller 324B and a fitting roller 324C. The drive motor 324A is connected and used to drive the roller 324B, and the roller 324B is separated from the fitting roller 324C by a predetermined distance for the pre-impregnated tape P to pass through therebetween. By having the drive motor 324A to rotate the roller 324B (with the pre-impregnated tape P limited in between), a roll-to-roll drive can be generated between the roller 324B and the fitting roller 324C so as to provide necessary friction and torsion to feed the pre-impregnated tape P to the guide-rail unit 326. In this embodiment, the drive motor 324A can be a servo motor, and the roller 324B can be a knurled-type urethane roller.

In one embodiment, the guide-rail unit 326 includes at least one guide rail for establishing a path to convey the pre-impregnated tape P. For example, as shown in FIG. 2, the guide-rail unit 326 includes a first guide rail 326A, a second guide rail 326B, a third guide rail 326C and a fourth guide rail 324D. The roller 324B and the fitting roller 324C are both disposed at the first guide rail 326A, the first guide rail 326A is connected to the second guide rail 326B, the second guide rail 326B is connected to the third guide rail 326C, the third guide rail 326C is connected to the fourth guide rail 324D, and the fourth guide rail 324D is further connected to the compaction head mechanism 330, in which the cutter mechanism 350 is located between the third guide rail 326C and the fourth guide rail 326D. In some other embodiments, the number of rails can be adjusted according to practical requirements.

Figure 3:
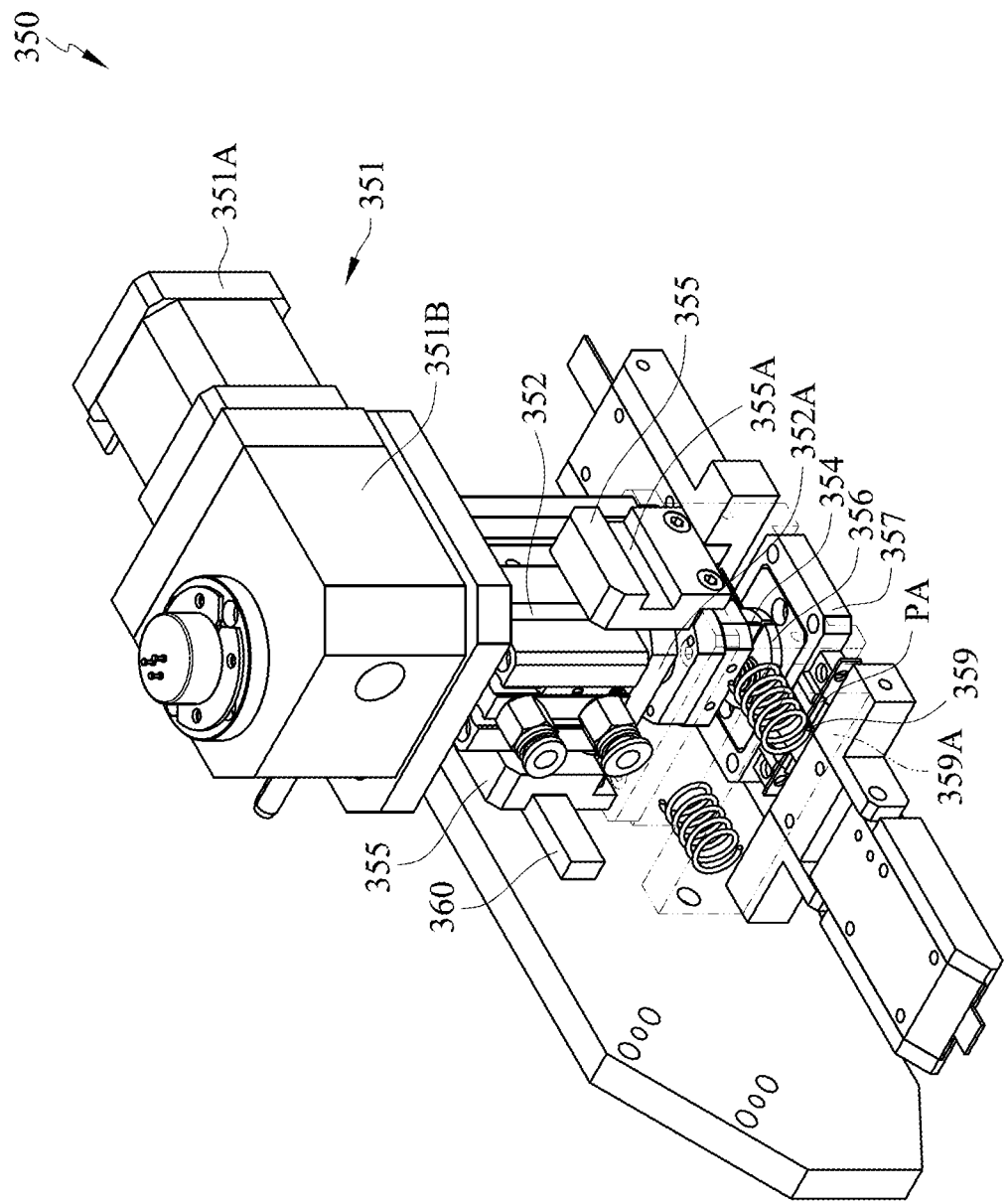
FIG. 3 shows schematically the cutter mechanism and the motion mechanism of FIG. 1.
Figure 4:
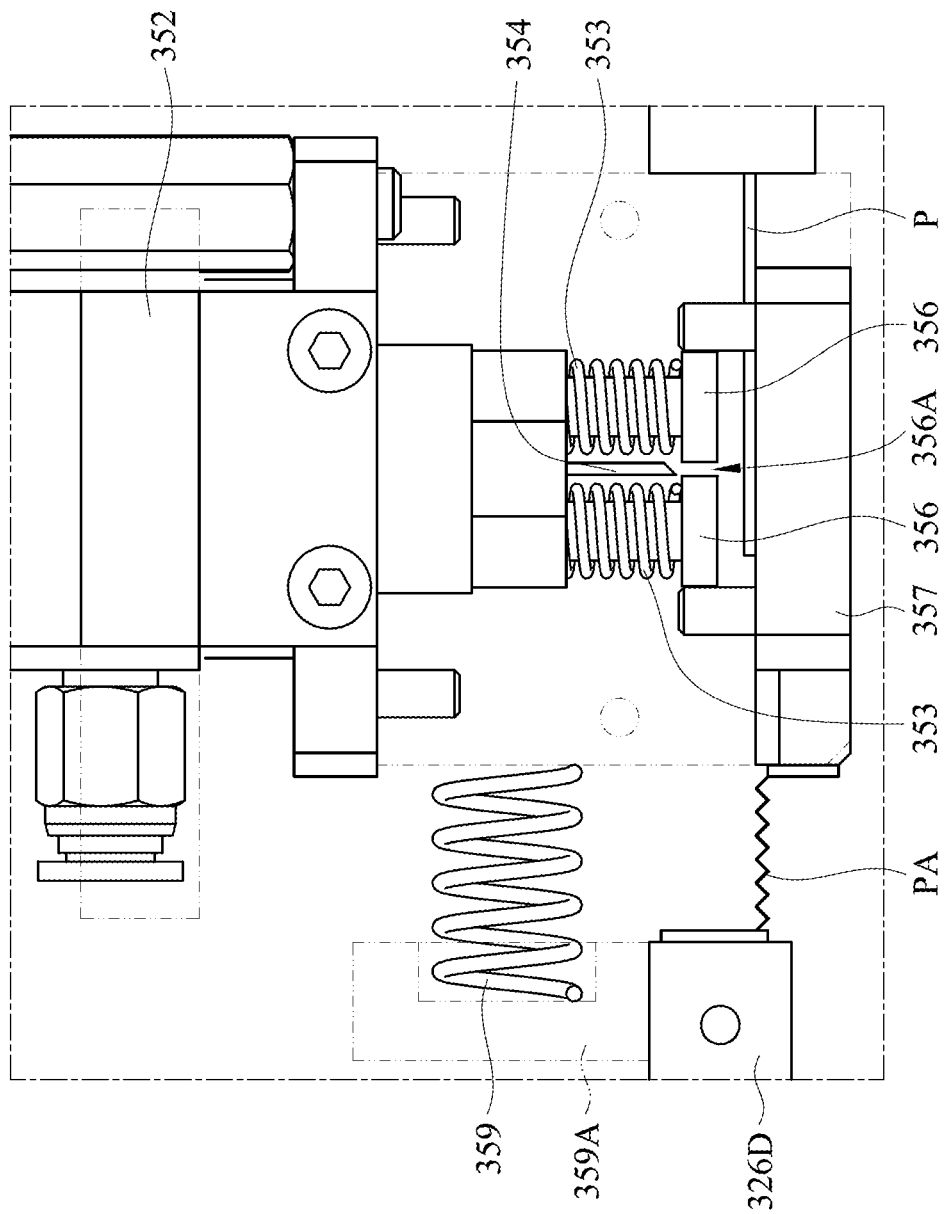
FIG. 4 is a schematic enlarged view of the cutter mechanism of FIG. 3.
Figure 5B:
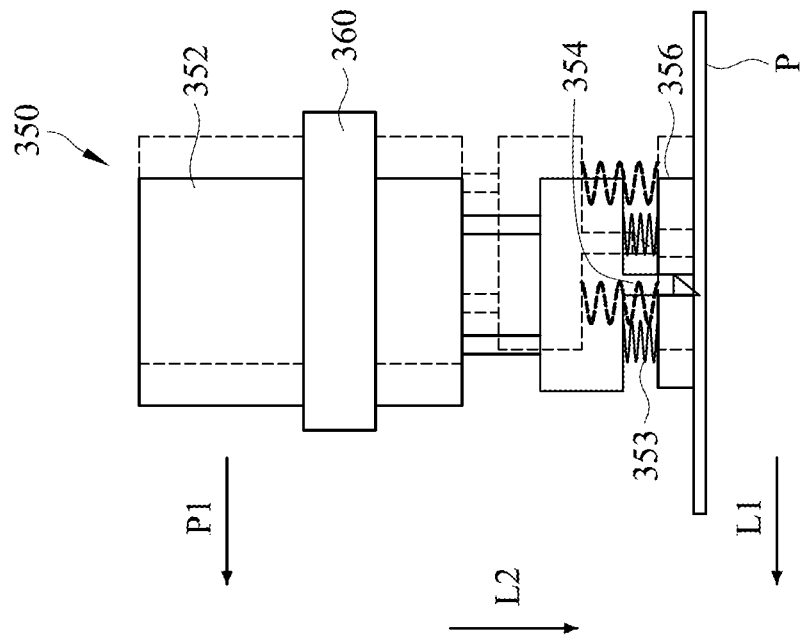
FIG. 5B shows schematically a further stage of FIG. 5A that the cutter mechanism moves along the moving path to cut the pre-impregnated tape.
Figure 5A:
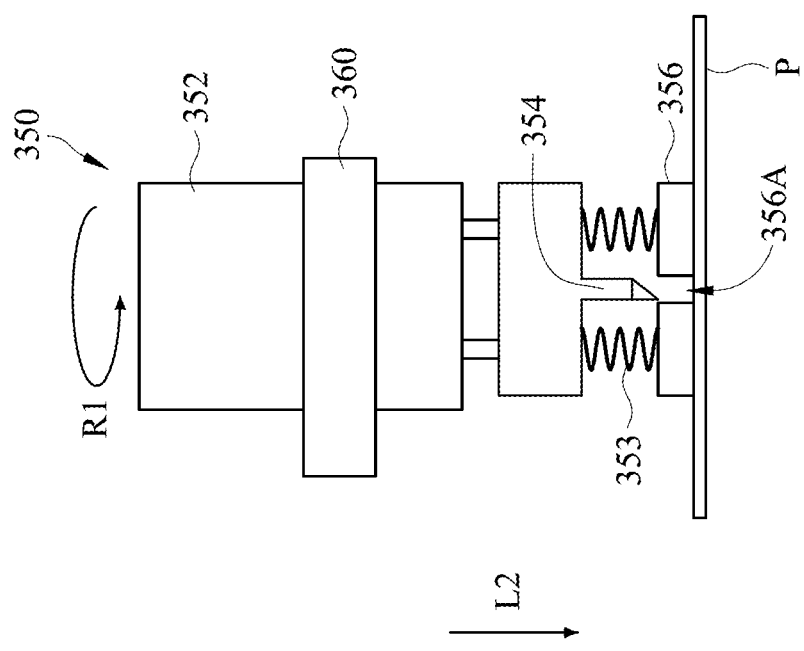
FIG. 5A shows schematically a state of FIG. 4 that the pressure element depresses the pre-impregnated tape.

Referring to FIG. 1, FIG. 3, FIG. 4, FIG. 5A and FIG. 5B, the cutter mechanism 350 and the motion mechanism 360 of the tape laying device 300 in this embodiment is particularly shown, but the structuring thereof is not specifically limited thereto in this disclosure. FIG. 3 shows schematically the cutter mechanism and the motion mechanism of FIG. 1, FIG. 4 is a schematic enlarged view of the cutter mechanism of FIG. 3, FIG. 5A shows schematically a state of FIG. 4 that the pressure element depresses the pre-impregnated tape, and FIG. 5B shows schematically a further stage of FIG. 5A that the cutter mechanism moves along the moving path to cut the pre-impregnated tape. In order to demonstrate schematically the cutting process of the cutter mechanism, the base element 357 of FIG. 4 is omitted in both FIG. 5A and FIG. 5B. As shown in FIG. 1, FIG. 3, FIG. 4, FIG. 5A and FIG. 5B, the cutter mechanism 350 and the associated elements can be arranged according to practical requirements. For example, the cutter mechanism 350 includes a drive unit 352, a spring element 353, a cutter 354 and a pressure element 356, in which the drive unit 352 can be a pneumatic cylinder, a motor and any device the same. The drive unit 352 is used to move the cutter 354, the spring element 353 and the pressure element 356. The spring element 353, disposed between the cutter 354 and the pressure element 356, can be a spring or any other elastic element. The cutter 354 can be a cutter assembly. The pressure element 356 can be a plate body. In one embodiment, the pressure element 356 can be prepared by a material with comprehensive friction. In addition, the motion mechanism 360 of this embodiment can be a horizontal displacement unit, and the active path P1 (as shown in FIG. 5B) of the cutter mechanism 350 can be a linear path.

FIG. 6A to FIG. 6C show schematically different motion states of the tape laying device of FIG. 1. FIG. 7A is a schematic enlarged view of the cutter mechanism of FIG. 6A. FIG. 7B is a schematic enlarged view of the cutter mechanism of FIG. 6B. FIG. 7C is a schematic enlarged view of the cutter mechanism of FIG. 6C. Referring to FIG. 5A through FIG. 7C together, in this embodiment, while the pre-impregnated tape P is driven by the compaction head mechanism 330 to move continuously along the moving path L1 during the roll-to-adhere process as shown in FIG. 5A, FIG. 6A and FIG. 7A, the drive unit 352 drives the cutter 354, the pressure element 356 and the spring element 353 toward the cutting direction L2, such that the pressure element 356 can depress the pre-impregnated tape P, with the through hole 356A of the pressure element 356 to expose the pre-impregnated tape P. At this stage, the spring element 353 is not depressed, and the cutter 354 is separated from the pre-impregnated tape P by a distance. The pressure element 356 is then to depress the pre-impregnated tape P. As shown in FIG. 5B, FIG. 6B and FIG. 7B, the pre-impregnated tape P is driven by the compaction head mechanism 130 to move continuously along the moving path L1 to undergo the roll-to-adhere process, and the cutter 354 keeps moving in the cutting direction L2 to pass through the through hole 356A of the pressure element 356 to cut the pre-impregnated tape P. In addition, at the same time, since the pressure element 356 has depressed the pre-impregnated tape P, thus while the cutter mechanism 350 cuts the pre-impregnated tape P, the pre-impregnated tape P is moved along the moving path L1 so as to drive the cutter mechanism 350 to move along the motion mechanism 360 for performing the active path P1 (the linear path in FIG. 5B). Thereupon, the cutter mechanism 350 would displace with the pre-impregnated tape P. While the cutter 354 keeps moving in the cutting direction L2, the pre-impregnated tape P is cut by the cutter 354, and depressed simultaneously by the spring element 353. As shown in FIG. 6C and FIG. 7C, after the pre-impregnated tape P has been cut, the pressure element 356 would move in the third direction L3 (reverse to the cutting direction L2), and the spring element 353 would send the cutter 354 back to the initial position shown in FIG. 4. In another embodiment, while the cutter mechanism 350 cuts the pre-impregnated tape P, the motion mechanism 360 would drive the cutter mechanism 350 to follow the linear path so as to have the cutter mechanism 350 to move with the pre-impregnated tape P.

Referring back to FIG. 3, the cutter mechanism 350 further includes a rotation element 351. The rotation element 351, connected with the drive unit 352, is used to rotate the drive unit 352. In this embodiment, the rotation angle can be adjusted in accordance with the adhering direction and also practical requirements. The rotation element 351 includes a motor 351A and a transmission element 351B. The motor 351A, connected with the transmission element 351B, can be a step motor, and the transmission element 351B can be a worm drive consisted of at least a worm gear and a worm. The transmission element 351B is further connected with the drive unit 352, drive unit 352 such as a pneumatic cylinder. Through the motor 351A to drive the transmission element 351B, the drive unit 352 can rotate therealong. The transmission element 351B can be a worm drive so as to form the drive unit 352 as a rotational cylinder. In one embodiment, as shown in FIG. 3, the drive unit 352 can include a rotating bearing 352A, but not limited thereto.

Referring to FIG. 5A, the drive unit 352 is rotated in a rotation direction R1 by a predetermined angle such as 60° or any arbitrary angle per practical requirements. While the drive unit 352 is rotated, the spring element 353, the cutter 354 and the pressure element 356 are synchronously rotated, such that the cutter 354 can provide different cutting angles, which will be elucidated in FIG. 8A through FIG. 9B as follows.

Figure 8A:
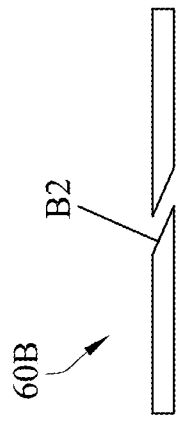
FIG. 8A is a schematic view of an exemplary example of the tape roll after being cut.
Figure 8B:
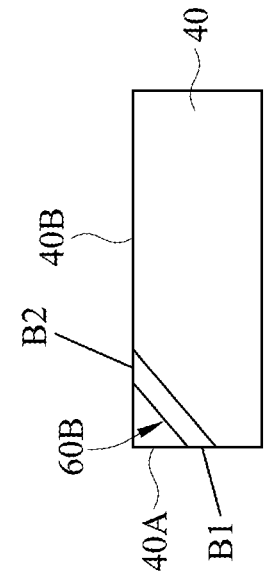
FIG. 8B shows schematically the tape roll of FIG. 8A being adhered to a mould surface.
Figure 9A:
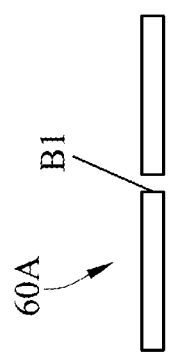
FIG. 9A is a schematic view of another exemplary example of the tape roll after being cut.
Figure 9B:
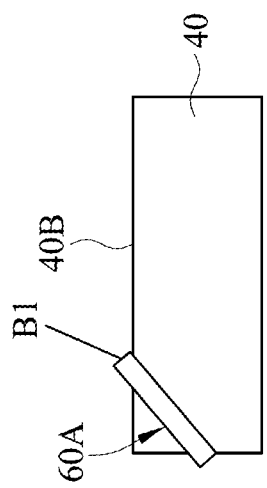
FIG. 9B shows schematically the tape roll of FIG. 9A being adhered to a mould surface.

Referring to FIG. 8A and FIG. 8B, this pre-impregnated tape 60A is straightly cut to provide a straight-down edge B1. When this cut pre-impregnated tape 60A is adhered obliquely onto the mould surface 40, then the straight-down edge B1 of the pre-impregnated tape 60A would be partly protrusive over the boundary 40B of the mould surface 40. In this situation, an additional cutting step is required to remove the protrusive part of the pre-impregnated tape 60A over the boundary 40B of the mould surface 40. Thus, in this disclosure, the cutting angle of the cutter 354 can be adjusted in accordance with the adhering orientation of the pre-impregnated tape. As shown in FIG. 9A, the edge B2 of the pre-impregnated tape 60B is an oblique surface, or an edge with an inclination angle. Thus, when the pre-impregnated tape 60B is adhered to the mould surface 40 at an adhering angle identical to that applied to the aforesaid pre-impregnated tape 60A, then the edges B2 of the pre-impregnated tape 60B would be flush with the respective boundaries 40A, 40B of the mould surface 40. Namely, this disclosure can determine the angling of the cutter 354 according to practical needs, such that a desired angular cut at the cutter 354 can be provided. Upon such an arrangement, the pre-impregnated tape can provide cut edges with different angling. Then, with a proper laminating arrangement of the pre-impregnated tapes having different adhering orientations, the adhesion strength thereof can be enhanced, the edges of the respective pre-impregnated tape can be flush with the corresponding boundaries of the mould surface, and no additional post treatment is required.

In this embodiment, the drive unit 352 is used to drive the cutter 354, the spring element(s) 353 and the pressure element 356. The drive unit 352 is connected with the cutter 354, and the spring element(s) 353 is(are) connected between the cutter 354 and the pressure element 356. As shown, the two spring elements 353, disposed to shield the cutter 354, can be springs or the like elastic components. The cutter 354 can be an assembly having a cutting edge. The pressure element 356 can be a plate furnished with a through hole 356A for allowing the cutter 354 to pass therethrough.

In one embodiment, the cutter mechanism 350 further includes a base element 357 disposed under the pressure element 356. While the pressure element 356 is depressing the pre-impregnated tape P, the pre-impregnated tape P is clamped between the pressure element 356 and the base element 357, in which the base element 357 can be a supportive structure to sustain thereon the pre-impregnated tape P. When the cutter 354 passes through the through hole 356A of the pressure element 356 to cut the pre-impregnated tape P, the base element 357 can be treated as a buffer structure for the cutter 354 to provide a predetermined cutting depth or an over cut. Alternatively, the cutting upon the pre-impregnated tape P can be finished upon when the cutter 354 touches the base element 35. Of course, in some other embodiments, a program can be used to set the desired cutting depth of the cutter 354.

In one embodiment, the cutter mechanism 350 further includes two side panels 355 disposed oppositely at lateral sides of the drive unit 352. Each of the side panels 355, connected with the drive unit 352, includes a sliding chute 355A. The motion mechanism 360 includes linear sliding rails to slide along the respective sliding chutes 355A, such that the cutter mechanism 350 can be horizontally displaced with respect to the motion mechanism 360. In some other embodiments, the motion mechanism 360 can be a slider or a sliding chute, while the corresponding side panel can be a sliding rail or a slider, respectively. Thus, through the motion mechanism 360 and the side panel(s) 355 to form a horizontal moving pair, the cutter mechanism 350 can move accordingly.

In one embodiment, the tape laying device 300 further includes a position-restoring unit 359 disposed between a fourth guide rail 326D of the guide-rail unit 326 and the cutter mechanism 350. Practically, one end of the position-restoring unit 359 is disposed above the fourth guide rail 326D, and connected therebetween via a connector 359A, while another end of the position-restoring unit 359 is connected with the cutter mechanism 350. When the aforesaid cutter mechanism 350 is moved, the position-restoring unit 359 would be depressed correspondingly. Further, with the resilience provided by the position-restoring unit 359, the cutter mechanism 350 can be pushed to resume the original or initial position (as shown in FIG. 4). It shall be explained that the position-restoring unit 359 of this embodiment can be a spring or any elastic element the like to provide substantial rigidity for avoiding the cutter mechanism 350 to shake or fluctuate.

In one embodiment, the tape laying device 300 further includes a telescopic sheath PA connected between the fourth guide rail 326D of the guide-rail unit 326 and the base element 357 of the cutter mechanism 350. The telescopic sheath PA can be a rail. When the pre-impregnated tape P is cut, the pre-impregnated tape P is guided by the telescopic sheath PA to the fourth rail 326D.

Figure 10:
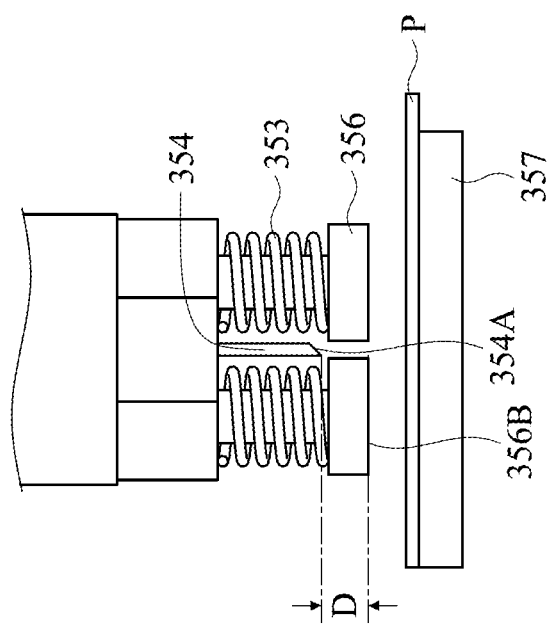
FIG. 10 is a schematic enlarged view of the cutter mechanism in accordance with this disclosure.

FIG. 10 is a schematic enlarged view of the cutter mechanism in accordance with this disclosure. It shall be explained that the motion and connection related to the pre-impregnated tape P prior to being transmitted to the cutter mechanism 350 can refer to the foregoing description. In the following description, the interaction with the cutter mechanism 350 would be elucidated.

In one embodiment, a distance D between the cutter tip 354A of the cutter 354 and the bottom surface 356B of the pressure element 356 is 3.5 mm. For example, in the case that a piston area of a pneumatic cylinder (an exemplary example of the drive unit 352 of FIG. 7A) is 3.14 cm$^2$ and a piston velocity thereof is 31.8 cm/s, then the resulted flow rate (piston area×piston velocity) would be 6 L/min to push the pneumatic cylinder. If the cutter 354 needs to move 3.5 mm before the pre-impregnated tape P can be cut, then the cutting time would be 0.011 sec (3.5 mm/318 mm). Namely, in this example, since the distance D between the cutter 354 and the pressure element 356 is 3.5 mm, then only 0.011 seconds are needed to cut the pre-impregnated tape P. If the adhering velocity is 1000 mm/s, then the displacement of the cutter 354 for this 0.011 seconds would be 11 mm, to satisfy simultaneously the needs of adhering and cutting.

Figure 11A:
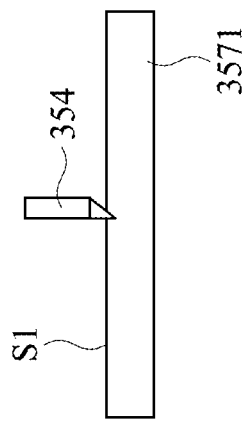
FIG. 11A is a schematic view of an exemplary example of the base element in accordance with this disclosure.
Figure 11B:
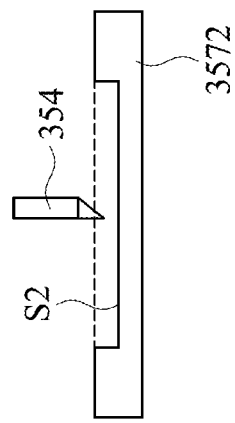
FIG. 11B is a schematic view of another exemplary example of the base element in accordance with this disclosure.

In addition, the base element 357 can be used as a supportive structure under the pre-impregnated tape P. While the cutter 354 passes through the pressure element 356 to cut the pre-impregnated tape P, the base element 357 can be further used as a buffer structure. In one embodiment, as shown in FIG. 11A, the base element 3571 is a buffer structure made of a soft material for allowing the cutter 354 to cut a surface S1 of the base element 3571, or to penetrate through the surface S1. Since the base element 3571 is soft to provide buffering, thus the cutter 354 can be prevented from being blunt after frequently hitting the base element 3571. In one embodiment, the aforesaid soft material can be a teflon. In another embodiment, as shown in FIG. 11B, the base element 3572 includes a cavity S2 for allowing the cutter 354 to protrude therein by a predetermined depth, or for an over cut. It shall be explained that the base element 3572 would rotate with the cutter mechanism 350.

Figure 12A:
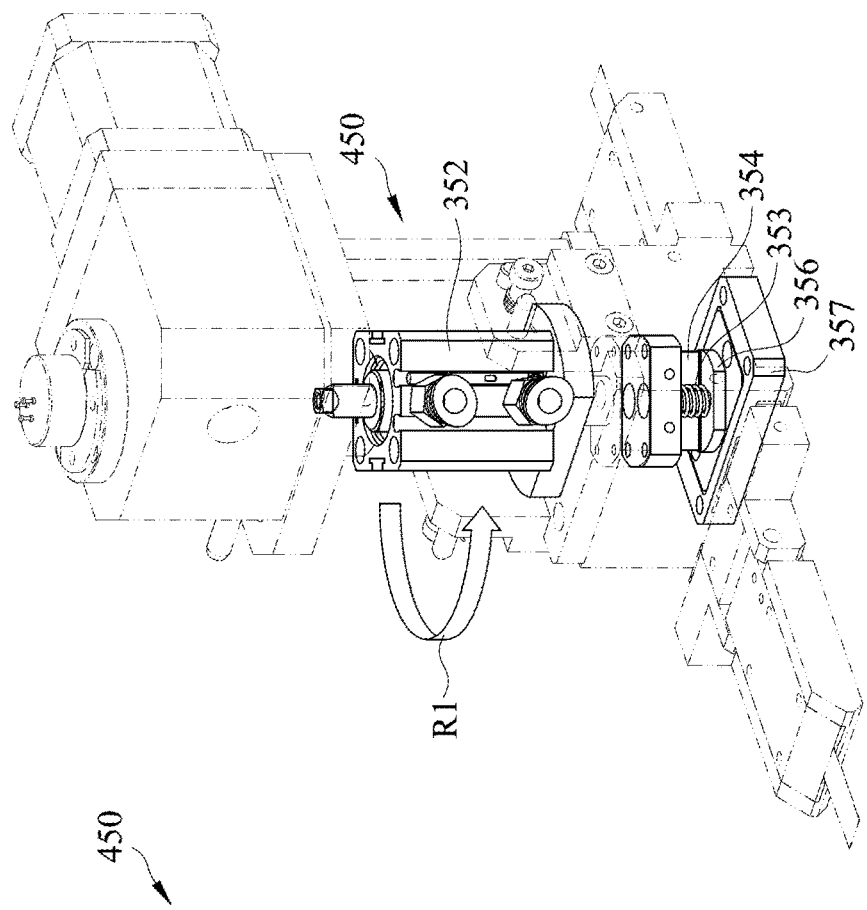
FIG. 12A is a schematic view of another embodiment of the cutter mechanism in accordance with this disclosure.
Figure 12B:
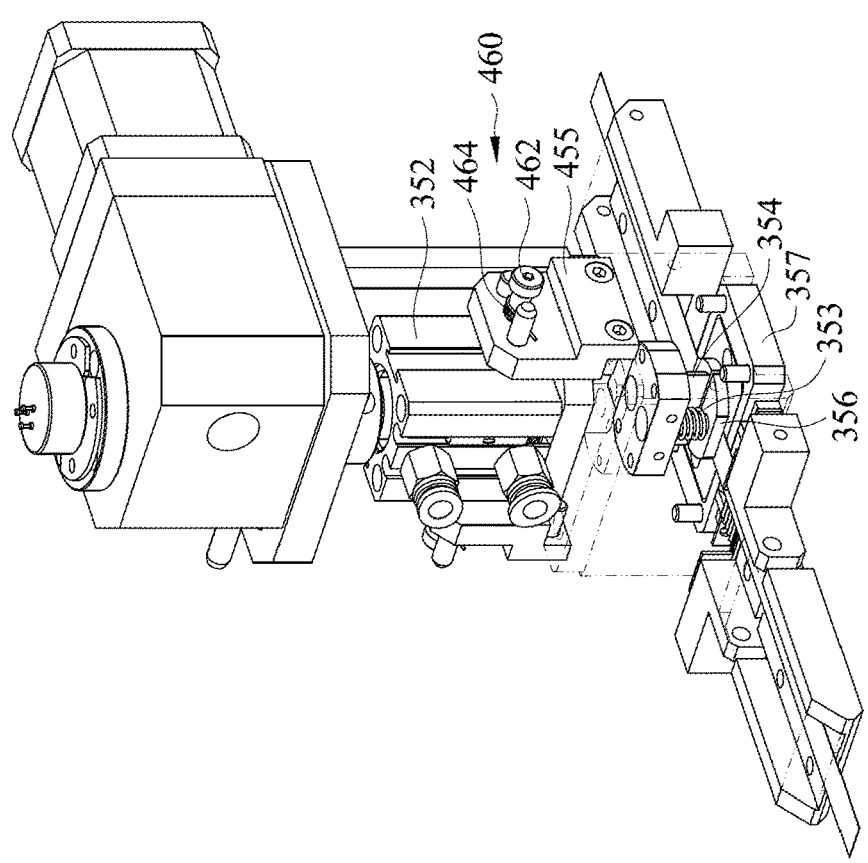
FIG. 12B shows another state of FIG. 12A, where the cutter mechanism is rotated by an angle.

FIG. 12A is a schematic view of another embodiment of the cutter mechanism in accordance with this disclosure. FIG. 12B shows another state of FIG. 12A, where the cutter mechanism is rotated by an angle. Referring to FIG. 12A and FIG. 12B, it shall be explained that the cutter mechanism 450 of FIG. 12A or FIG. 12B is resembled to the cutter mechanism 350 of FIG. 3. Both of which can make the drive unit 352 as a rotational cylinder capable of rotating in a rotation direction R1 to provide different orientations to the cutter 354.

A difference between the cutter mechanism 450 of FIG. 12A and the cutter mechanism 350 of FIG. 3 is that: the cutter mechanism 350 of FIG. 3 utilizes the motion mechanism 360 to perform a horizontal displacement, i.e., a linear active path P1 of the cutter mechanism 350, and, on the other hand, the cutter mechanism 450 of FIG. 12A utilizes the motion mechanism 460 to perform a swing motion, i.e., an arc active path of the cutter mechanism 450.

In detail, the two side panels 455 are disposed individually to opposite lateral sides of the drive unit 352. In this embodiment, the motion mechanism 460 and the side panels 455 are integrated to form a rocking module. The motion mechanism 460 includes a pivot element 462 and a torsion spring 464. The pivot element 462 is pivotally connected with the respective side panel 455, and the torsion spring 464 is mounted at the pivot element 462.

FIG. 13A to FIG. 13C show schematically different motion stages of the cutter mechanism of FIG. 12A. Referring to FIG. 12A, FIG. 13A to FIG. 13C, the front end 357A of the base element 357 includes a lead angular structure AT adjacent to the fourth guide rail 326D. Under such an arrangement, the pressure element 356 can depress at the pre-impregnated tape P, such that the moving pre-impregnated tape P can move with the cutter mechanism 450. As shown in FIG. 13B, while the cutter mechanism 450 cuts the pre-impregnated tape P moving along the moving path, the cutter mechanism 450 would follow the arc path with respect to the motion mechanism 460. That is, the cutter mechanism 450 would rotate about the pivot element 462 in a swing direction R2, such that the cutter mechanism 450 and the driven tape roll can swing and move toward the fourth guide rail 326D. Since the pre-impregnated tape P is swung along the arc path, thus it can be guided by the lead angular structure AT to follow the fourth guide rail 326D. While the cutter mechanism 450 is swung, the cutter 354 is kept moving and cutting the pre-impregnated tape P, and simultaneously the torsion spring 464 would be rotated to pose the cutter 354 in a swing direction R2, in which the swing direction R2 is different to the rotation direction R1 of FIG. 12B. Then, as shown in FIG. 13C, after the cutter 354 cuts the tape roll, the pressure element 356, the spring element 353 and the cutter 354 are resumed back to corresponding initial positions, and also the cutter mechanism 450 would swing back and forth by the torsion spring 464 so as to sent the cutter mechanism 450 back to its initial position. In another embodiment, while the cutter mechanism 450 cuts the pre-impregnated tape P, the motion mechanism 460 would drive the cutter mechanism 450 to move along the arc path.

To sum up, in the tape laying device of the present disclosure, while in the process of cutting the pre-impregnated tape, the cutter mechanism can be linked to the moving path of the pre-impregnated tape, such that the pre-impregnated tape can be adhered and cut continuously. Thereupon, no temporary stop of moving of the pre-impregnated tape to undergo a cutting thereof is required in processing the continuous lamination of this disclosure.

Furthermore, since the present disclosure can achieve the purpose of continuous lamination, so the supply of heating energy can be stable and continuous. Thereupon, localized over heating at the pre-impregnated tape due to the aforesaid temporary stop can be avoided, thus heating upon the adhering surface of the pre-impregnated tape can be uniform, and the adhering quality thereof can be substantially enhanced.

In addition, the present disclosure can save processing time in addition to reducing the waste of tape materials and eliminating the need to reserve the tape materials.

In addition, compared with the discontinuous lamination in the art, the present disclosure provides advantages of continuous lamination, and the product would present relatively low resistance to bending deformation within the elastic limit, be less prone to deformation, absorb more impact energy, but be hard to deform by external forcing.

Furthermore, in the present disclosure, since the cutter is rotated to provide different cutting angles to the pre-impregnated tape, thus the cut pre-impregnated tapes can be woven and stacked with different moving paths and directions. Also, the adhered pre-impregnated tape can be flush with the corresponding boundary of the mould surface, and thus no additional adjustment upon the adhered pre-impregnated tapes is required.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A tape laying device, applied to adhere a pre-impregnated tape onto a mould surface, comprising:
   a tape transmission mechanism, configured to transmit the pre-impregnated tape;
   a compaction head mechanism, connected with the tape transmission mechanism, configured to depress and drive the pre-impregnated tape transmitted by the tape transmission mechanism to follow a moving path so as to adhere the pre-impregnated tape onto the mould surface;
   a cutter mechanism, configured to cut the pre-impregnated tape, wherein the cutter mechanism includes a drive unit and a side panel disposed laterally to the drive unit;
   a heating mechanism, disposed downstream to the cutter mechanism, configured to heat the pre-impregnated tape; and
   a motion mechanism, configured to make the cutter mechanism move toward the moving path while the cutter mechanism cuts the pre-impregnated tape, wherein the cutter mechanism has an active path;
   wherein the motion mechanism and the side panel are integrated to form a rocking module configured to make the cutter mechanism being swung with respect to the motion mechanism.

2. The tape laying device of claim 1, wherein the active path of the cutter mechanism is a linear path.

3. The tape laying device of claim 2, wherein, while the cutter mechanism cuts the pre-impregnated tape, the pre-impregnated tape moves along the moving path to drive the cutter mechanism to move along the motion mechanism so as to perform the linear path.

4. The tape laying device of claim 2, wherein, while the cutter mechanism cuts the pre-impregnated tape, the motion mechanism drives the cutter mechanism to perform the linear path.

5. The tape laying device of claim 1, wherein the active path of the cutter mechanism is an arc path.

6. The tape laying device of claim 5, wherein, while the cutter mechanism cuts the pre-impregnated tape, the pre-impregnated tape moves along the moving path to drive the cutter mechanism to perform the arc path with respect to the motion mechanism.

7. The tape laying device of claim 5, wherein, while the cutter mechanism cuts the pre-impregnated tape, the motion mechanism drives the cutter mechanism to perform the arc path.

8. The tape laying device of claim 1, wherein the cutter mechanism includes a cutter, a spring element and a pressure element, the drive unit is used to move the cutter, the spring element and the pressure element, the pressure element is used to depress the pre-impregnated tape, and the cutter is used to cut the pre-impregnated tape.

9. The tape laying device of claim 8, wherein the spring element is disposed between the pressure element and the cutter.

10. The tape laying device of claim 8, wherein the cutter is separated from the pressure element by a distance.

11. The tape laying device of claim 8, wherein the cutter mechanism further includes a base element disposed under the pressure element.

12. The tape laying device of claim 11, wherein the base element is a buffer structure made of a soft material.

13. The tape laying device of claim 11, wherein the base element includes a cavity.

14. The tape laying device of claim 8, wherein the cutter mechanism includes a rotation element connected with the drive unit, the rotation element is used to rotate the drive unit, and the drive unit rotates the cutter and the pressure element.

15. The tape laying device of claim 14, wherein the rotation element includes a motor and a transmission element connected with the drive unit, and the motor drives the transmission element to further rotate the drive unit.

16. The tape laying device of claim 15, wherein the transmission element is a worm drive.

17. The tape laying device of claim 8, wherein the cutter mechanism includes a side panel disposed laterally to the drive unit, the motion mechanism and the side panel are integrated to form a horizontal moving pair configured to make the cutter mechanism move with respect to the motion mechanism.

18. The tape laying device of claim 17, wherein the horizontal moving pair includes a sliding rail and a sliding chute.

19. The tape laying device of claim 17, wherein the side panel includes a sliding chute, and the motion mechanism is a linear sliding rail.

20. The tape laying device of claim 1, further including a position-restoring unit connected with the cutter mechanism.

21. The tape laying device of claim 1, further including an unreel mechanism configured to store the pre-impregnated tape, the tape transmission mechanism being connected with the unreel mechanism, the tape transmission mechanism being configured to receive the pre-impregnated tape transmitted from the unreel mechanism.

22. The tape laying device of claim 21, wherein the cutter mechanism is disposed between the unreel mechanism and the compaction head mechanism.

23. The tape laying device of claim 21, wherein the unreel mechanism includes a reel shaft and a torque limiter, the torque limiter is connected with the reel shaft, the pre-impregnated tape is reeled around the reel shaft, and the torque limiter is configured to control tension of the pre-impregnated tape.

24. The tape laying device of claim 21, wherein the tape transmission mechanism includes an idler unit, a drive unit and a guide-rail unit, the unreel mechanism is connected with the idler unit, the idler unit is connected with the drive unit, the drive unit is connected with the guide-rail unit, and the guide-rail unit is connected with the compaction head mechanism.

25. The tape laying device of claim 24, wherein the idler unit includes at least one idler.

26. The tape laying device of claim 24, wherein the drive unit includes a drive motor, a roller and a fitting roller, the drive motor connects and drives the roller, and the roller is separated from the fitting roller by a distance.

27. The tape laying device of claim 24, wherein the guide-rail unit includes at least one guide rail.

28. The tape laying device of claim 24, further including a telescopic sheath connected between the guide-rail unit and the cutter mechanism.

29. A tape laying device, applied to adhere a pre-impregnated tape onto a mould surface, comprising:
- a tape transmission mechanism, configured to transmit the pre-impregnated tape;
- a compaction head mechanism, connected with the tape transmission mechanism, configured to depress and drive the pre-impregnated tape transmitted by the tape transmission mechanism to follow a moving path so as to adhere the pre-impregnated tape onto the mould surface;
- a cutter mechanism, configured to cut the pre-impregnated tape, wherein the cutter mechanism includes a side panel, a pressure element and a base element, and the base element is disposed under the pressure element, and the base element includes a lead angular structure;
- a heating mechanism, disposed downstream to the cutter mechanism, configured to heat the pre-impregnated tape; and
- a motion mechanism, configured to have the cutter mechanism to move toward the moving path while the cutter mechanism cuts the pre-impregnated tape, wherein the cutter mechanism has an active path, and the motion mechanism includes a pivot element and a torsion spring, wherein the pivot element is pivotally connected with the side panel, and the torsion spring is connected with the pivot element.

* * * * *